UNITED STATES PATENT OFFICE.

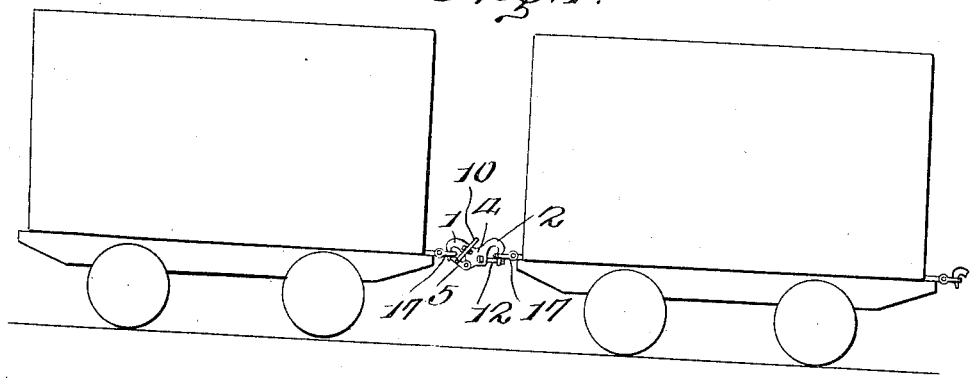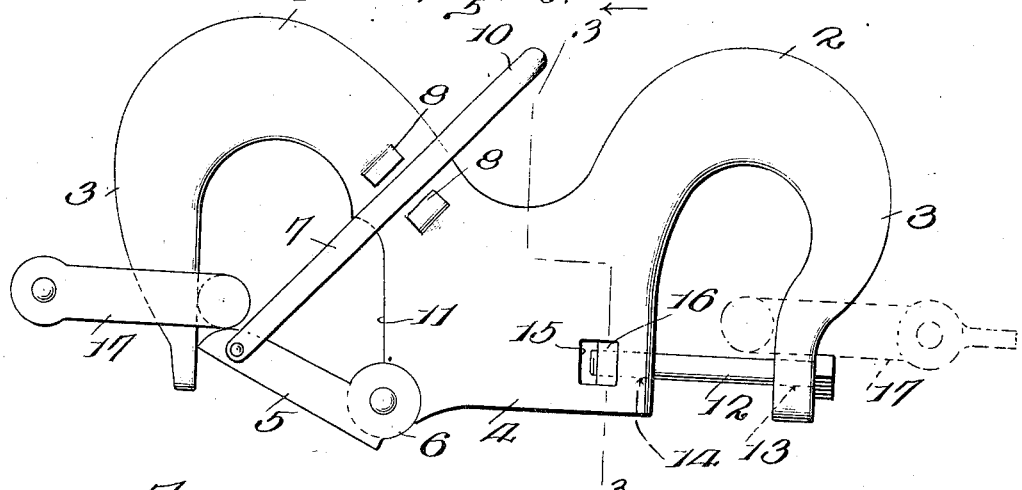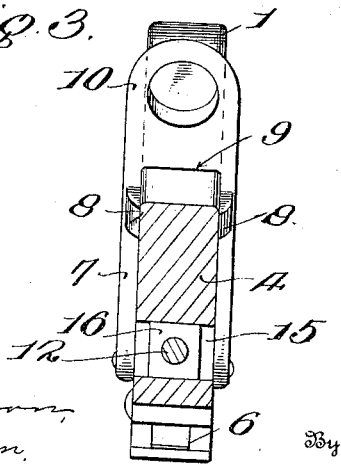

JOHN G. LOZENSKI, OF LEAVENWORTH, KANSAS.

COUPLING-HOOK.

997,630.  Specification of Letters Patent.  Patented July 11, 1911.

Application filed July 9, 1909, Serial No. 506,852. Renewed March 7, 1911. Serial No. 612,927.

*To all whom it may concern:*

Be it known that I, JOHN G. LOZENSKI, citizen of the United States, residing at Leavenworth, in the county of Leavenworth and State of Kansas, have invented certain new and useful Improvements in Coupling-Hooks, of which the following is a specification.

This invention comprehends certain new and useful improvements in coupling devices, and the invention has for its object an improved device of this character which is susceptible of many applications, although primarily intended for use in connecting the cars employed in mines for transporting the coal or other material mined. It is well known that these cars are customarily connected by an ordinary hook which is apt to become accidentally detached, particularly should the cars jam together, the hook being also inconvenient in that it requires the cars being drawn together to effect the uncoupling thereof.

The present invention aims to obviate these disadvantages and provides a coupling device which is very efficient in use and may be readily substituted for the ordinary hook above mentioned.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing, in which:

Figure 1 is a view illustrating the application of my invention; Fig. 2 is a side elevation thereof; and, Fig. 3 is a transverse section on the line 3—3 of Fig. 2.

Corresponding and like parts are referred to in the following description and indicated in all the views of the drawing by the same reference characters.

My improved coupler consists essentially of two oppositely disposed downwardly facing hooks 1 and 2 which are preferably cast or otherwise formed of integral structure, the hooks being substantially similar and being arranged in the same plane. These hooks embody substantially straight bills 3 and a shank 4 that is common to both hooks.

In order to close the hook 1, I employ a mousing or latch 5 which is connected at its lower end to the shank 4 by means of a pivot joint 6, the mousing normally tending to swing downwardly by gravity across the entrance of the hook with its free end bearing against the corresponding bill 3. The mousing is controlled by a substantially U-shaped bail 7 which straddles the shank and has its terminals pivoted to the free end of the mousing on opposite sides thereof, the side members of the bail sliding between pairs of spaced guide lugs 8 formed at the opposite faces of the shank, whereby to maintain the bail against any swinging movement. A cross bar 9 is disposed between the spaced members of the bail and is adapted to abut against the shank to limit the downward movement of the mousing and support the same in an operative position. The portion of the bail above the cross bar constitutes a hand or finger loop 10, through the medium of which the bail may be readily manipulated. By drawing upwardly upon the bail the mousing is swung to an inoperative position against the adjacent edge of the shank, the shank being preferably recessed, as indicated at 11, to accommodate the mousing in such position and thus afford an unobstructed entrance to the hook. The other hook 2 is closed by a bolt 12 which is adapted to be inserted through registering apertures 13 and 14 formed in the bill and shank respectively. The aperture 14 leads into a relatively large central opening 15 which extends through the opposite faces of the shank and is designed for the reception of a nut 16, the extremity of the bolt being adapted to be projected through the opening 14 and threaded into the nut to maintain the bolt in position across the entrance of the hook.

This coupler is designed particularly for use in connecting box cars employed in mines for hauling coal or the like, the box cars being equipped at their meeting ends with the customary clevises 17 that are mounted to swing about horizontal transverse axes. In applying the coupler, the bolt 12 is first removed and the hook 2 engaged with one of the clevises, the bolt being then returned to place in order to connect the hook permanently to such clevis. The operator then draws upwardly on the bail 7 to lift the mousing 5, whereupon the hook 1 is engaged with the remaining clevis. Upon releasing the bail the mousing returns by gravity to its operative position across the entrance of the hook, whereby to prevent the accidental detachment of the last named clevis and to effectually couple the cars together. By reversing the above operation the uncoupling of the cars may be expeditiously accomplished.

Attention is particularly directed to the fact that the side members of the bail project angularly from the free end of the mousing and extend between the same and the corresponding end of the recess 11, whereby to preclude the possibility of the clevis becoming lodged behind the mousing as would prevent the mousing from being lifted to open or inoperative position. The bill 3 of the hook 1 is substantially straight and is vertically disposed, thus insuring of the positive release of the clevis upon the raising of the mousing, and obviating the necessity of drawing the cars together, as is required with the ordinary coupling hook in general use. Should the cars jam together there is no danger of my improved coupling releasing the clevis, and in such a contingency the weight of the coupler swings the two clevises downwardly and the former thus assumes a position below the bottoms of the cars and is prevented from becoming mashed or otherwise injured.

From the foregoing description in connection with the accompanying drawing, it will be apparent that I have provided an improved coupling device which is considerably more efficient than the hook ordinarily employed for connecting mine cars; which may be advantageously employed for a variety of purposes; which embodies to a marked degree the characteristics of simplicity, durability and strength; and which consists of comparatively few parts that are not likely to get out of order.

Having thus described the invention what is claimed as new is:

1. A coupler including a hook, a mousing pivoted to the hook for closing entrance thereof, a member pivoted to the mousing and slidable across the hook, and means disposed on the hook for limiting the pivotal movement of the member.

2. A coupler including a hook, a mousing pivoted at one end to the hook and movable across the entrance thereof, and a bail straddling the hook and disposed in angular relation to the mousing and connected terminally to the free end of the mousing.

3. A coupler embodying a hook, a mousing pivoted at one end to the hook, and a bail straddling the hook and pivoted at its terminals to the free end of the mousing for controlling the movement thereof.

4. A coupler embodying a hook, a swinging mousing for closing the hook, and a bail straddling the hook and pivoted terminally to the mousing for controlling the movement of the latter, the hook being formed on opposite sides with pairs of spaced guide lugs embracing the respective members of the bail to hold the same against swinging movement.

5. A coupler embodying a hook, a swinging mousing for closing the hook, a U-shaped bail straddling the hook and pivoted terminally to the mousing, and a cross bar extending between the members of the bail in proximity to the bend thereof to provide a hand hold, the cross bar being arranged to abut against the hook to limit the movement of the bail in one direction.

6. A coupler including a hook formed in its inner edge with a recess, and a mousing pivotally mounted at one end in the recess and arranged to extend across the entrance of the hook, the mousing being movable to inoperative position against the inner edge of the hook and being entirely received in the recess to provide an unobstructed entrance to the hook.

In testimony whereof I affix my signature in presence of two witnesses.

JOHN G. LOZENSKI. [L. S.]

Witnesses:
BEAMONT THOMAS,
EDWARD C. HOFSTRA.

---

Copies of this patent may be obtained for five cents each, by addressing the "Commissioner of Patents, Washington, D. C."